US009454706B1

(12) United States Patent
Musleh et al.

(10) Patent No.: US 9,454,706 B1
(45) Date of Patent: Sep. 27, 2016

(54) ARABIC LIKE ONLINE ALPHANUMERIC CHARACTER RECOGNITION SYSTEM AND METHOD USING AUTOMATIC FUZZY MODELING

(71) Applicant: KING FAHD UNIVERSITY OF PETROLEUM AND MINERALS, Dhahran (SA)

(72) Inventors: Dhiaa A. A. Musleh, Dhahran (SA); Khaldoun M. K. Halawani, Dhahran (SA); Sabri Abdullah Mahmoud Mohammed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/808,586

(22) Filed: Jul. 24, 2015

(51) Int. Cl.
G06K 9/00 (2006.01)
G06K 9/18 (2006.01)
G06K 9/52 (2006.01)
G06K 9/62 (2006.01)

(52) U.S. Cl.
CPC . *G06K 9/18* (2013.01); *G06K 9/52* (2013.01); *G06K 9/6215* (2013.01); *G06K 9/6267* (2013.01); *G06K 2209/01* (2013.01); *G06K 2209/013* (2013.01)

(58) Field of Classification Search
None
See application file for complete search history.

(56) References Cited

U.S. PATENT DOCUMENTS 7,142,715 B2 11/2006 Fahmy et al.
8,254,686 B2 8/2012 He et al.
8,615,131 B2 12/2013 El-Sana et al.

OTHER PUBLICATIONS

M. Kherallah, L. Haddad, and A. M. Alimi, "On-line handwritten digit recognition based on trajectory and velocity modeling, " Pattern Recognition Letters vol. 29, Issue 5, Apr. 1, 2008, pp. 580-594.*
Ramzi, A., et al., "Online Arabic Handwritten Character Recognition using Online-Offline Feature Extraction and Back-Propagation Neural Network", 1$^{st}$ International Conference on Advanced Technologies, for Signal and Image Processing—ATSIP'2014, MSI-116, Total 6 pages, (Mar. 17-19, 2014).
Lawal, I.A., et al., "Recognition of Handwritten Arabic (Indian) Numerals using Freeman's Chain Codes and Abductive Network Classifiers", International Conference on Pattern Recognition, pp. 1884-1887, (2010).

* cited by examiner

*Primary Examiner* — Uptal Shah
(74) *Attorney, Agent, or Firm* — Oblon, McClelland, Maier & Neustadt, L.L.P

(57) ABSTRACT

A system and associated methodology recognizes an Arabic like alphanumeric character using fuzzy modeling. The method receives a handwritten Arabic like alphanumeric character, stores fuzzy models of a plurality of Arabic like alphanumeric characters, preprocesses the handwritten Arabic like alphanumeric character, extracts features from the preprocessed Arabic like alphanumeric character, computes a similarity value based on fuzzy comparison between points of the preprocessed Arabic like alphanumeric character and the stored fuzzy models, classifies the handwritten Arabic like alphanumeric character based at least in part on the similarity value and outputs a classified alphanumeric character.

17 Claims, 19 Drawing Sheets

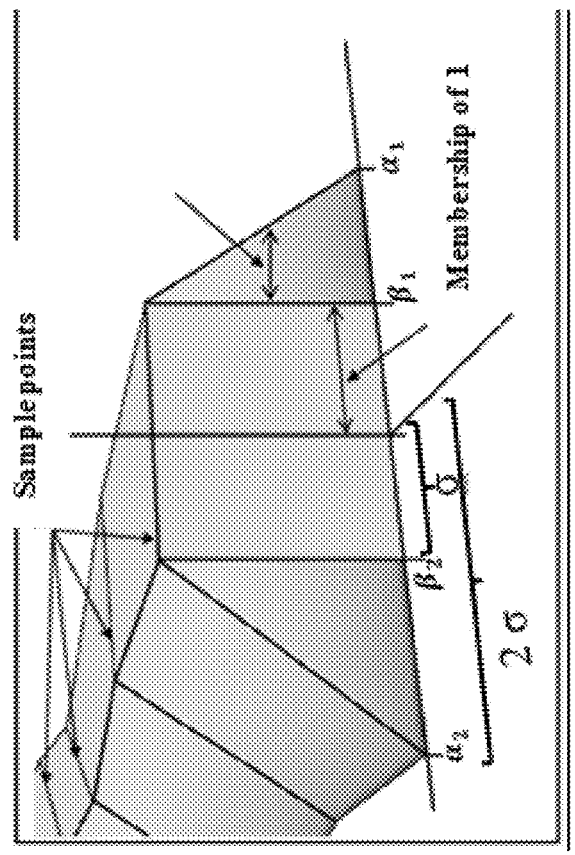
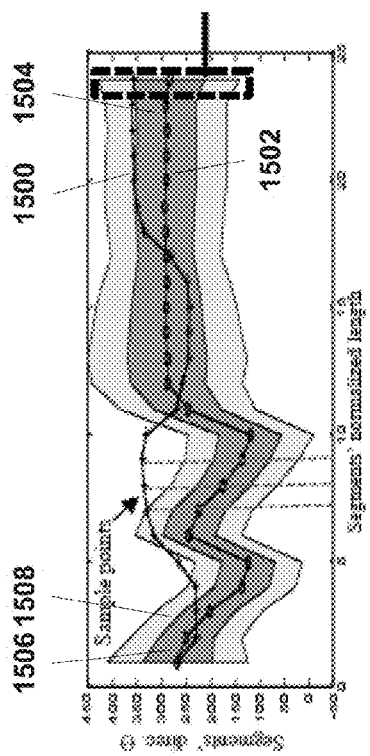
Fig. 15B
Fig. 15A

ARABIC LIKE ONLINE ALPHANUMERIC CHARACTER RECOGNITION SYSTEM AND METHOD USING AUTOMATIC FUZZY MODELING

TECHNICAL FIELD

The present disclosure relates to methods and systems for online alphanumeric character recognition.

BACKGROUND

Automatic recognition of handwritten text is important in providing a natural and convenient way of two-way communications between users and computers. Offline handwritten recognition deals with handwriting in the form of images normally obtained by scanners. Online text recognition deals with handwriting captured by a tablet or similar touch screen device. In the online recognition, the two-dimensional coordinates (x,y) of successive points of writing are stored based on their order whereas the complete writing is available as an image in the offline handwriting.

Most of the existing systems for automatic recognition of handwritten text deal with offline handwritten recognition. The reason for this may be attributed to the challenges related to online Arabic handwriting recognition systems. Some of these challenges include the need for special hardware; the lack of comprehensive benchmark database for Arabic online text; and techniques employed for other languages may not work for online Arabic text recognition. In addition, the writing using online devices is less controlled than writing using a pen on paper. As a result, the variability in writing is more, which makes the problem of online writer-independent handwriting recognition a challenging pattern recognition problem.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present disclosure. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure relates to an Arabic like alphanumeric character recognition method that receives a handwritten Arabic like alphanumeric character from a user using a alphanumeric input device, stores fuzzy models of a plurality of Arabic like alphanumeric character, preprocesses, by the processing circuitry, the handwritten Arabic like alphanumeric character, extracts, by the processing circuitry, features from the preprocessed Arabic like alphanumeric character, computes, by the processing circuitry, a similarity value based on fuzzy comparisons between points of the preprocessed Arabic like alphanumeric character and the stored fuzzy models, classifies, by the processing circuitry, the handwritten Arabic like alphanumeric character based at least in part on the similarity value and outputs a classified alphanumeric character.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 15A is a graph that illustrates a fuzzy comparison between a sample digit and a fuzzy model according to one example;

FIG. 15B is a graph that shows a fuzzy model according to one example;

FIG. 18 is a table that shows a plurality of misclassified samples according to one example.

DETAILED DESCRIPTION

Figure 1:
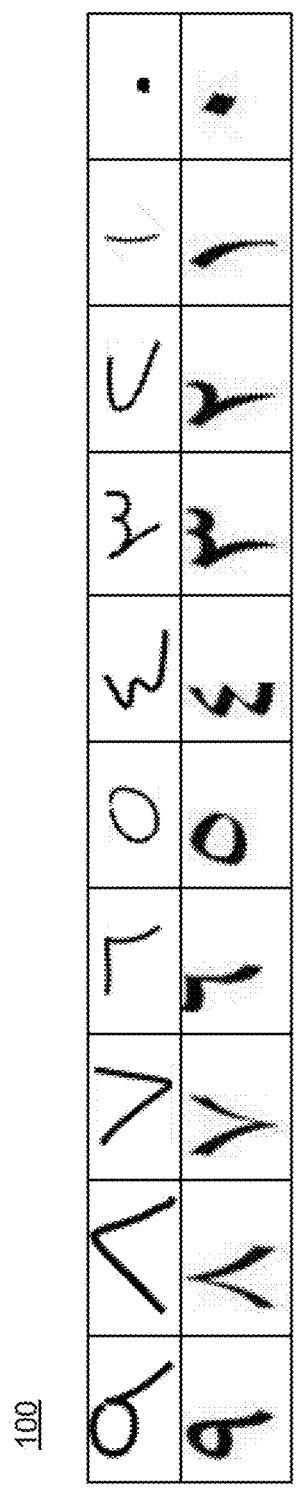
FIG. 1 is a table that shows samples of handwritten Arabic online digits according to one example.

Referring now to the drawings, wherein like reference numerals designate identical or corresponding parts throughout the several views, the following description relates to an online digits recognition system and associated methodology for automatic recognition of handwritten alphanumeric character such as Arabic like digits and Arabic like text. An Arabic like character or script may be, but not limited to, an Arabic, Persian, Malay, or Urdu character. An alphanumeric character may be a digit. In one embodiment, the alphanumeric character may be an alphabetic character.

In one embodiment, the system and associated methodology provides automatic recognition of online handwritten Arabic script alphanumeric character.

Handwritten symbol recognition systems improve the interaction between man and machine in many applications. For example, the automatic recognition of handwritten Arabic (Indian) digits has a variety of applications including banking systems, automation of postal services, and form filling.

In general, online handwritten recognition uses spatio-temporal representation of a digit input, whereas the offline handwritten recognition analyzes spatio-luminance of an image. A comprehensive survey of offline and online handwritten recognition methods is described in: Plamondon, R and Srihari, S. N "Online and off-line handwriting recognition: a comprehensive survey" IEEE transactions on Pattern Analysis and Machine Intelligence, 22 (1), 63-84 (2000) incorporated herein by reference in its entirety.

In recent years, much research has been conducted on the recognition of Arabic digits. Most of this research addressed offline Arabic handwritten digits. For example, a method for the recognition of isolated handwritten Arabic/Persian digits based on support vector machines and a new approach of feature extraction is described in: Sadri, J. C. Y. S and T. D. B, "Application of Support Vector Machines for Recognition of Handwritten Arabic/Persian Digits", Proceedings of Second Iranian Conference on Machine Vision and Image Processing, 1, 300-307 (2003) incorporated herein by reference in its entirety. Another approach uses a statistical method embedded with statistical features for Farsi/Arabic handwritten zip code recognition as described in: Mozaffari, S. and Faez, K, "Structural Decomposition and Statistical Description of Farsi/Arabic", Document Analysis and Recognition Proceedings, Eighth International Conference on. IEEE, 237-241 (2005) incorporated herein by reference in its entirety. Another method that uses Gabor-based features and Support Vector Machines is described in Mahmoud, S. A., "Arabic (Indian) Handwritten digits recognition using Gabor-based features", International conference on innovations in information technology, 683-687 (2008) incorporated herein by reference in its entirety. A technique for the recognition of optical off-line handwritten Arabic numerals using hidden Markov models (HMM) is described in: Mahmoud, S. A., "Recognition of writer-independent off-line handwritten Arabic (Indian) numerals using hidden Markov models", Signal processing, 88 (4), 844-857 (2008) incorporated herein by reference in its entirety. The performances of different classification and feature extraction techniques on recognizing Arabic digits are summarized in Abdelazeem, S., and El-sherif E "Arabic handwritten digit recognition" International Journal of Document Analysis and Recognition (IJDAR) 11 (3), 127-141 (2008). A method for the automatic recognition of Arabic bank check digits based on features extracted by using the Log Gabor filters is described in Mahmoud, S. A. and Al-Khatib, W. G., "Recognition of Arabic (Indian) bank check digits using log-Gabor filters", Applied intelligence, 35 (3), 445-456, (2010) incorporated herein by reference in its entirety.

One method for online Arabic digits recognition uses spatial features. An exemplary method with a reported recognition rate of 93.14% is described in: Beigi, H. S. M, Nathan, K., Clary, G. J., and Subrahmonia, J., "Challenges of Handwriting Recognition in Farsi, Arabic, and other languages with Similar writing styles: An Online Digit Recognizer", Proceedings of the $2^{nd}$ Annual Conference on Technological Advancements in Developing Countries, Columbia University New York, (1994) incorporated herein by reference in its entirety.

Trajectory and velocity modeling approaches may be applied in digit recognition. An exemplary system with a reported recognition rate of 95% is described in: Kherallah, M., Njah, S., Alimi, A. M. and Derbel, N., "Recognition of online handwritten digits by neural networks using circular and beta approaches", IEEE international conference on systems, Man and Cybernetics, 2, 164-169, (2002) incorporated herein by reference in its entirety.

Further, modeling quality may be improved by introducing elliptical parameters. A low pass Chebyshev filter may be applied to the data points as a preprocessing step to eliminate duplicate data points. An exemplary system with a reported global recognition rate of about 90% is described in: Kherallah, M., Alimi, A. M., and Derbel, N., "Online recognition of Handwritten digits by Self Organization Maps using elliptical and beta representations", IEEE Internat. Conf. SCS., 503-507, (2004) incorporated herein by reference in its entirety. To reduce the problem of dimensionality, a new method of the handwritten trajectory modeling based on multilayers perception (MLP) is may be used in a fuzzy concept. An exemplary method with a reported recognition rate of about 95.08% is described in Kherallah, M., Hadda, L., Alimi, A. M., and Mitiche, A., "On-line handwritten digit recognition based on trajectory and velocity modeling", Pattern Recognition Letters, 29 (5), 580-594, (2008) incorporated herein by reference in its entirety.

Another approach is based on structural features and Transition network. An exemplary technique with a reported recognition rate of 95% is described in: Al-Taani, A. T., "Recognition of On-line Arabic Handwritten Characters Using Structural Features", Journal of Pattern Recognition Research, 1, 23-37 (2010) incorporated herein by reference in its entirety.

Another method may use both temporal and spatial features to recognize Arabic online digits. An exemplary system with a reported overall recognition rate of 98.73% is described in: Abdul Azeem, S. Meseery, M. El, and Ahmed, H., "Online Arabic Handwritten Digits Recognition", International Conference on Frontiers in Handwriting Recognition, 135-140 (2012) incorporated herein by reference in its entirety.

FIG. 1 is a table that shows samples of handwritten Arabic online digits according to one example. Table 100 shows samples of handwritten Arabic digits from zero to nine along with their printed versions. Although printed/handwritten Arabic text is cursive, Arabic numerals are not cursive and hence segmentation of individual digits may not be needed unless the digits are touching.

Figure 2:
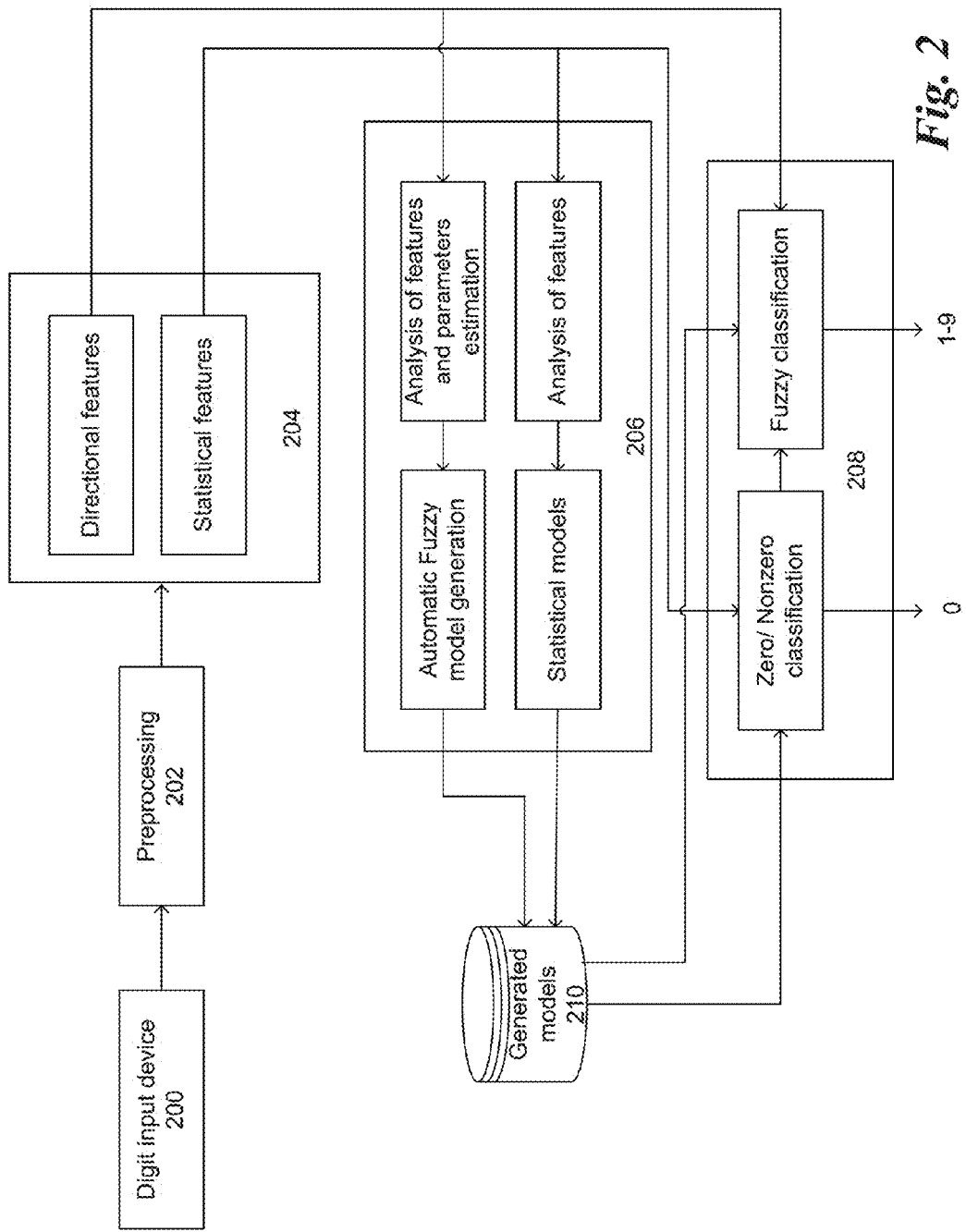
FIG. 2 is a block diagram representation of a system for Arabic online digits recognition according to one example.

FIG. 2 is a block diagram representation of a system for Arabic online digits recognition according to one example. Online digits may be captured using a digit input device 200. The digit input device 200 is any device that is capable of detecting and acquiring handwritten strokes. A user may write digits on an input screen of the digit input device 200 using a tablet pen. In other embodiments, the user may use a finger to input the digit. The digit input device 200 may be a digital tablet, a touch screen, a personal digital assistant (PDA) and the like. The input screen may be pressure sensitive, touch sensitive, light sensitive, and the like.

Writing using the digit input device 200 is less controlled than writing using a pen on a paper. Additionally, data collected by using the digit input device 200 is affected by hardware imperfections and trembles in writing. Hence, preprocessing is crucial to achieve a better recognition rate.

The system includes a preprocessing module 202. The preprocessing of the data may include simplification, smoothing and normalization. The preprocessing is applied to the data before features extraction. The features extraction module 204 may extract one or a combination of directional features and statistical features. Each of the modules described herein may be implemented in circuitry that is programmable (e.g., microprocessor-based circuits) or dedicated circuits such as application specific integrated circuits (ASICS).

The disclosed method includes a training phase and a classification phase. In the training phase, the system generates fuzzy models. In the classification phase, the system performs the actual recognition of a handwritten digit, using information learned in the training phase. The training phase module 206 may analyze the directional features to generate the fuzzy models. The training phase module 206 may alternatively, or additionally, analyze the statistical features to create statistical models. The fuzzy models and/or the statistical models are stored in the generated models database 210. The generated models stored in the database 210 are then used in the classification phase. The classification phase module 208 uses the statistical models stored in the generated models database 210 and/or the statistical features extracted in the features extraction module 204 to perform a zero/non-zero classification. The classification phase model 208 uses the fuzzy models stored in the generated models database 210 and the directional features extracted in the features extraction module 204 to perform the fuzzy classification.

Figure 3:
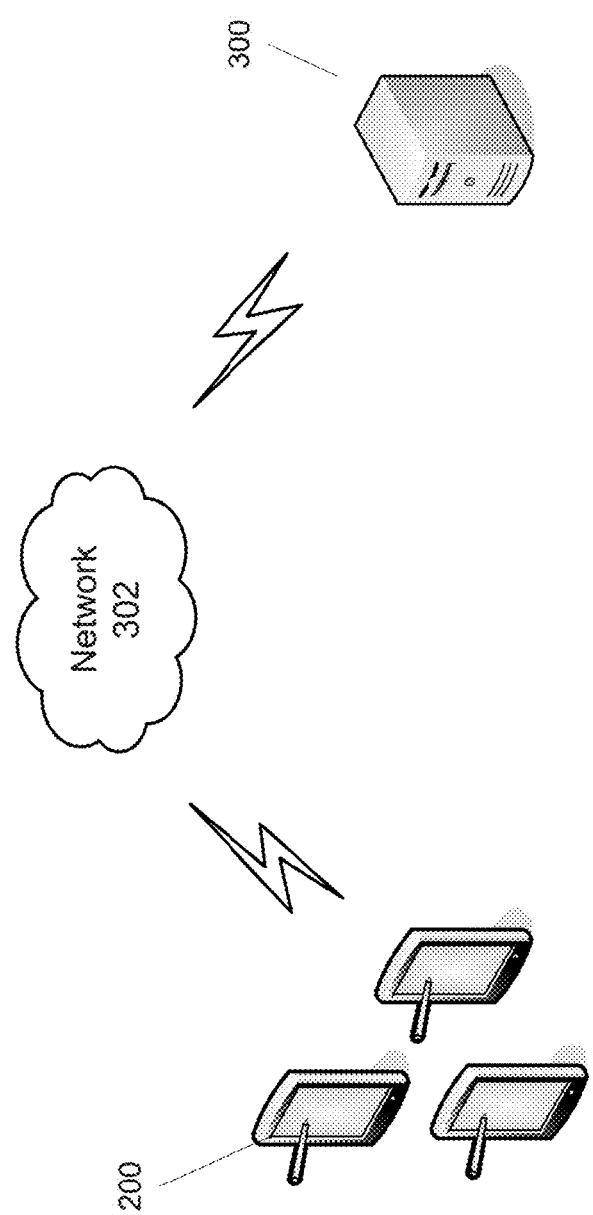
FIG. 3 is a schematic of the system for Arabic online digits recognition according to one example.
Figure 19:
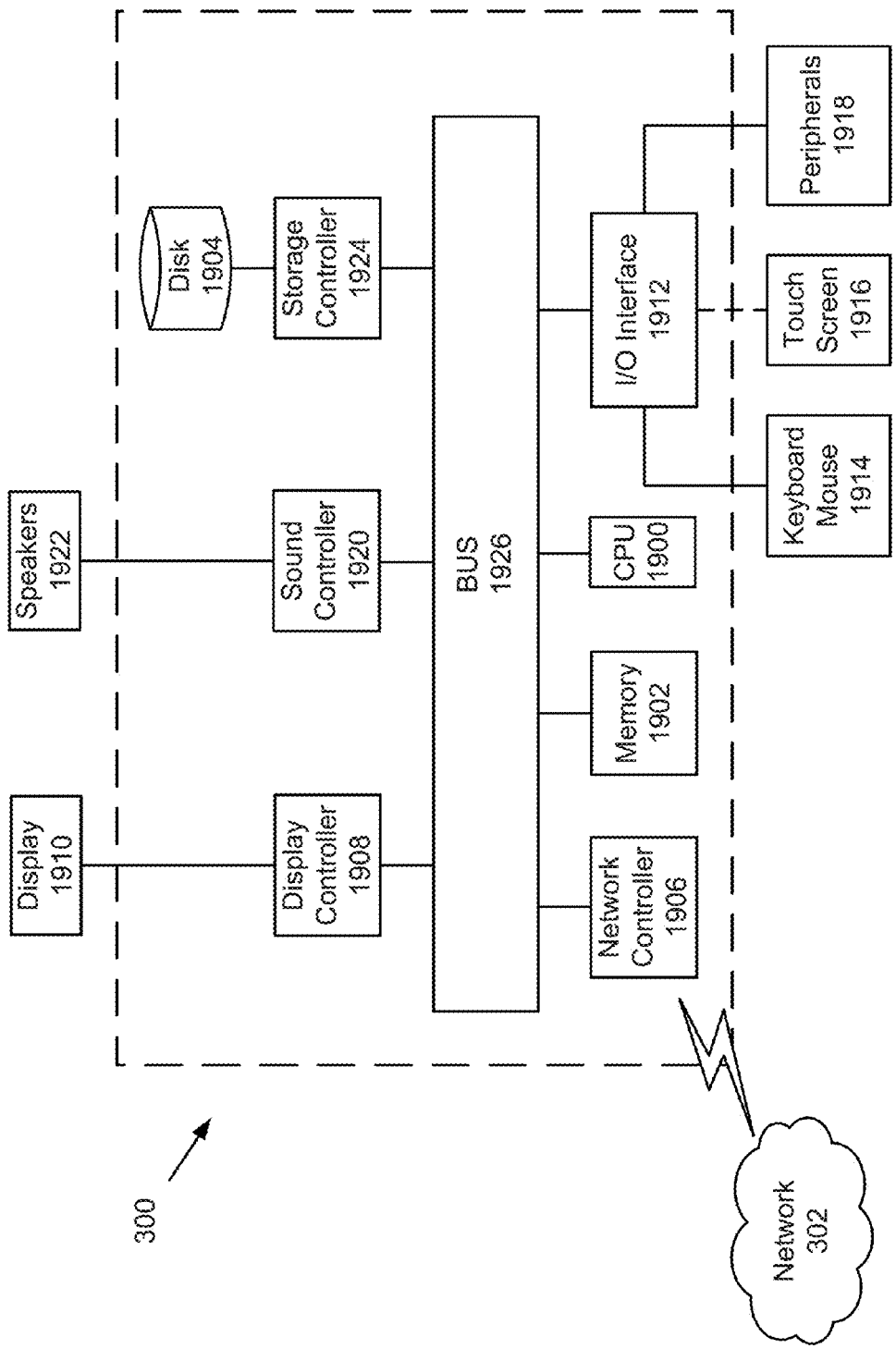
FIG. 19 is an exemplary block diagram of a server according to one example.

FIG. 3 is a schematic of the system for Arabic online digits recognition according to one example. A plurality of the digit input device 200 may connect via communication circuitry through a network 302 or local connection (e.g., Bluetooth, USB, etc.) to a server 300. The network 302 is any network that allows the digit input device 200 and the server 300 to communicate information with each other such as a Wide Area Network, Local Area Network or the Internet. The server 300 represents one or more servers that could be located in banks, postal offices or other facilities that uses electronic forms. As noted herein and in select embodiments, more than one digital input device 200 can connect to one or more servers 300. As described further below, one or more of the digital input devices may connect to the server 300 to provide collected data. The collected data could then be processed by the server 300 to output a classified digit. The server 300 may then send the classified digit to an external device to be used by host applications. The server 300 includes a CPU 1900 as shown in FIG. 19. In other embodiments, the digit input device or a locally connected device may include processing circuitry to perform the fuzzy classification of the digit. The digit input device 200 may store the fuzzy models. The digit input device 200 may connect to the server 300 to check whether the stored fuzzy models are up-to-date. In response to determining that the fuzzy models are not up-to-date, the digit input device 200 may download updated fuzzy models from the server 300.

Figure 4:
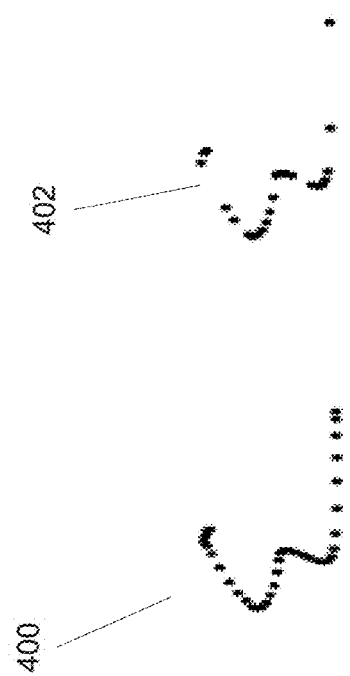
FIG. 4 is a graph that shows a digit before and after simplification according to one example.

FIG. 4 is a graph that shows a digit before and after simplification according to one example. In this example, the digit "four" is shown. The simplification to the digit curve, performed in the preprocessing module 200, may be that described in David Douglas & Thomas Peucker, "Algorithms for the reduction of the number of points required to represent a digitized line or its caricature", The Canadian Cartographer 10(2), 112-122 (1973) incorporated herein by reference in its entirety. The algorithm removes unimportant points from the original curve to simplify the curve. Trace 400 shows the digit "four" before simplification and 402 shows the digit "four" after simplification. Other simplification algorithms may be used as would be understood by one of ordinary skill in the art.

Figure 5:
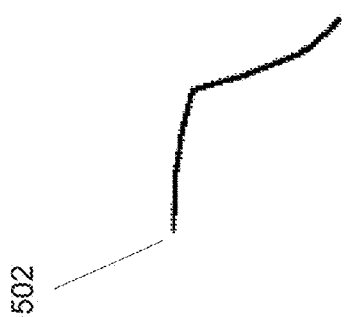
FIG. 5 is a graph that shows a digit before and after preprocessing according to one example.
Figure 5:
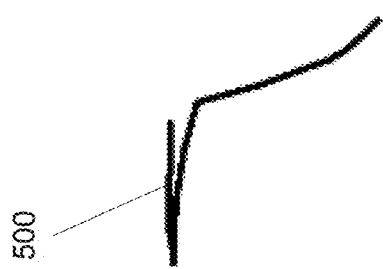

FIG. 5 is a graph that shows a digit before and after preprocessing according to one example. In this example, the digit "six" is used. 500 is the trace of digit six before preprocessing and 502 is the trace of the digit six after preprocessing. An algorithm that aims to remove the small curve variations and noise may be applied. In one embodiment, any small segment at the beginning or at the end is considered as noise. In addition, the CPU 1900 may check whether there are two consecutive segments that are very close to each other but having different directions. In response to determining that there are two consecutive segments close to each other, the first one may be considered as noise and is discarded.

The data may be normalized by adjusting all the sample lengths to a predetermined number of points. The predetermined number of points may be 25 points based on the common length of digit samples. The predetermined number of points is chosen as the smallest number of points that is enough to model the samples.

Extracting good and representative features is very important in any recognition system as it contributes to the recognition performance. Three sets of features may be extracted in the features extraction module 204. Statistical features may be extracted first. The statistical features represent shape features. The statistical features may be used to classify digits into zero and nonzero. Then, directional and histogram based features may be extracted. The directional and histogram based features may be used to recognize nonzero digits (digits from one to nine).

Figure 6:
FIG. 6 is a graph that shows samples of a digit at high magnification according to one example.

FIG. 6 is a graph that shows samples of a digit at high magnification according to one example. The graph shows samples of digit "zero" at high magnification. Unlike other digits, Arabic digit "zero" has a shape similar to a dot. The dot may have different shapes depending on the way it was written. These shapes are sometimes confused with other digits, especially with digit "one". A human seeing the samples shown in FIG. 6 may not be able to identify them as zeroes. Due to these difficulties, the digit "zero" is addressed separately based on the statistical features. The statistical features may include at least one of a length, a width, a height, a heights variance and an aspect ratio. The aspect ratio may be calculated based on the height and the width.

In the features extraction module 202, the directional features may be extracted as follows: each digit is represented by taking the directional information of all points representing the digit. The sequence of points that represents the digit "D" may be denoted as P. P may be expressed as $P=(x_i, y_i)$ where $i=1, 2, \ldots, n$. The directional features may be denoted by $\theta_D$. The directional features may be expressed by $\theta_D = [d_1, d_2, \ldots, d_{n-1}]$, where $d_i$ is the angle between the points $(x_i, y_i)$ and $(x_{i+1}, y_{i+1})$.

In the features extraction module 202, the histogram-based features may be extracted as described herein. Each digit consists of a set of segments and each segment has its own orientation. In the histogram-based features, a segment orientation takes value from a finite set of orientations or directions called standard writing directions. The standard writing directions can be regarded as quantization of a stroke direction.

Figures 7A, 7B:
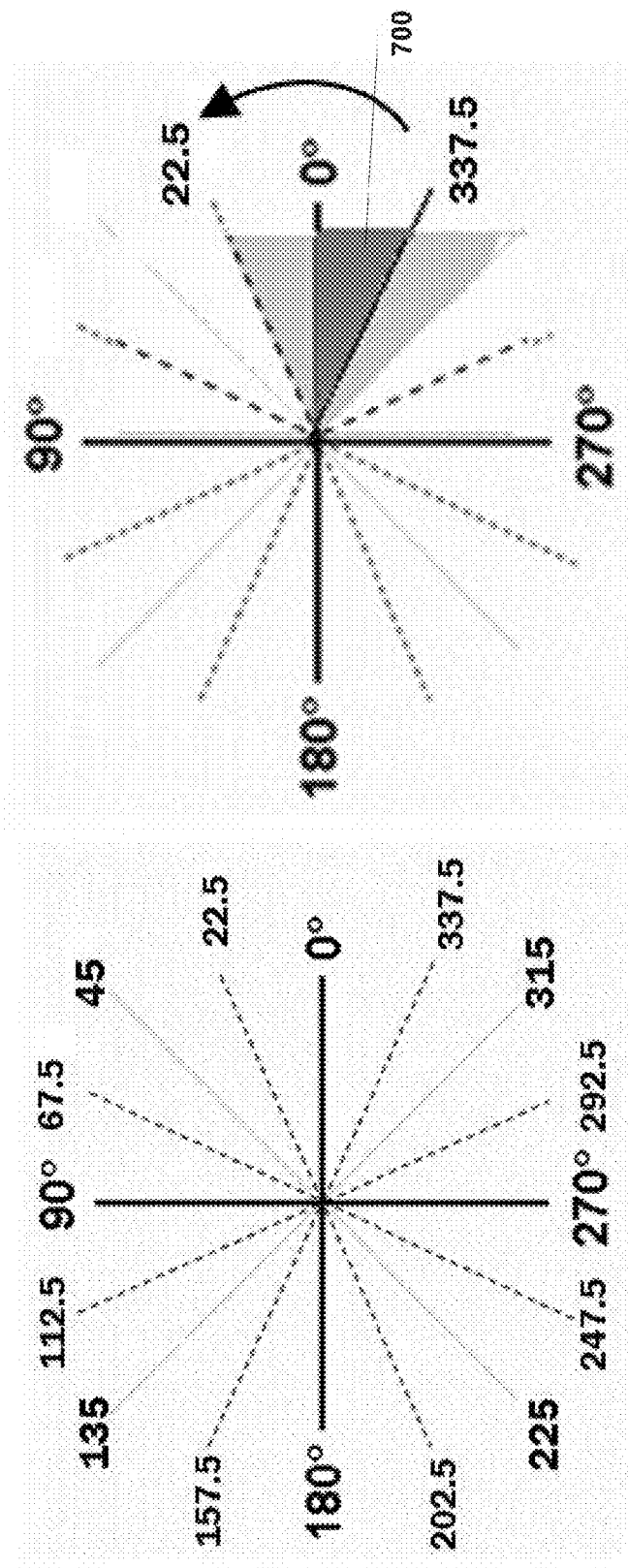
FIG. 7A is a graph that shows standard writing directions according to one example.
FIG. 7B is a graph that shows an overlap between the standard writing directions according to one example.

FIG. 7A is a graph that shows standard writing directions according to one example. The number of directions may be a predetermined number. In one embodiment, the number of directions may be sixteen. The gap between the directions is then 22.5° as shown in FIG. 7A. In other embodiments, the number of directions may be different.

The proposed histogram-based features are based on the histogram of digits segments orientation. The segments of the digit "D" may be denoted by $Seg_i = 1, 2, \ldots, n$. The histogram features vector may be denoted by $S_D = [p_1, p_2, \ldots, p_{16}]$, where 16 represents the number of directions and $p_j$ is the percentage of the segments of digit "D" in direction j. $p_j$ may be expressed by the following equation:

$$p_j = \frac{\text{Number of segments of direction } j}{\text{Number of all segments}} \quad (1)$$

FIG. 7B is a graph that shows an overlap between the standard writing directions according to one example. Due to the variations in writing styles, the computation of the segments directions should tolerate some level of variations in writing directions. To alleviate this problem, each direction i may be represented by i±22.5°. The direction i may represent all the segments having directions from i−22.5° up to i+22.5°. For example, the direction "0°" includes all segments having directions from −22.5° (337.5° up to +22.5°. Accordingly, there is an overlap of 22.5° between each two consecutive directions. FIG. 7B shows the overlap between direction "337.5°" and direction "0°". 700 represents the overlap region.

Figures 8A, 8B:
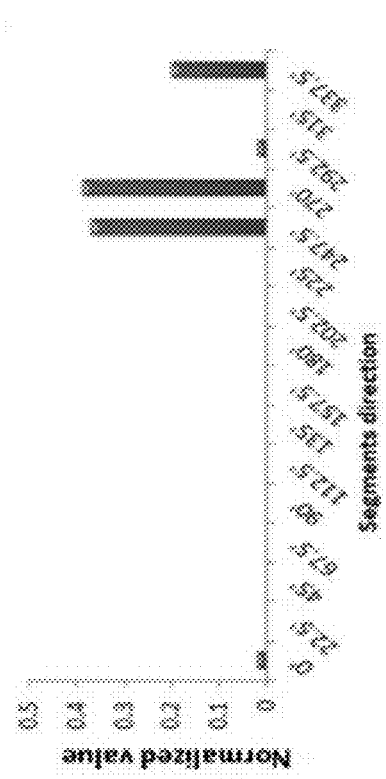
FIG. 8A is a graph that shows a sample digit with corresponding directions according to one example.
FIG. 8B is a graph that shows a histogram according to one example.

FIG. 8A is a graph that shows a sample digit with corresponding directions according to one example. In this example, the digit "six" is taken. The histogram features vector is calculated in the features extraction module 202. The histogram features vector is found to be $S_D = [0.02,0,0, 0,0,0,0,0,0,0,0,0.37,0.39,0.02,0,0.20]$. The histogram is shown in FIG. 8B.

The training phase module 206 creates the fuzzy models. The fuzzy models are used to address the problem of variability in writing. The variability in writing is increased with online handwritten digits due to hardware imperfections and trembles in writing.

The directional features of digits that reflect their shapes are determined in the features extraction module 204. The directional features may be used to build generic models that represent the digits (i.e., fuzzy models) in the training phase module 206. In order to generate the fuzzy models of digits, the lengths of all digits samples are normalized to a predetermined length. The predetermined length is 25 in one embodiment based on the common lengths of samples. After normalizing the samples, as explained above, the directional features of the training samples are extracted. The length of the directional feature vector is 24 since it represents the sequence of angles between each two consecutive points.

Figure 9:
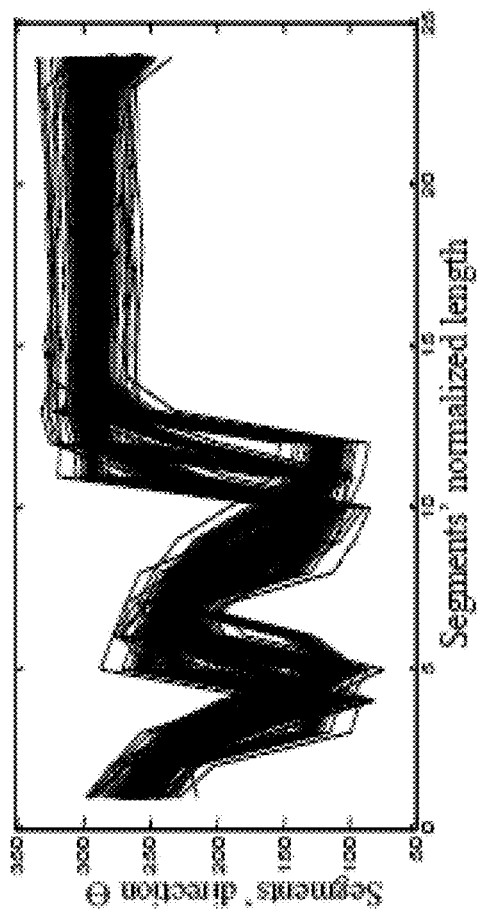
FIG. 9 is a graph that shows directional representation of several training samples of a digit according to one example.

FIG. 9 is a graph that shows directional representation of several training samples of a digit according to one example. The graph shows the directional representation of several training samples of the digit "three" written by different writers obtained using the digit input device 200. In one embodiment, a Model Trend Line (MTL) which is a single trajectory that represents the mean of all samples is computed. In other embodiments, a Model Envelope (ME), where the top and bottom envelopes for the aggregated samples is used in addition to, or as an alternative to, the MTL. The top and bottom envelopes of the samples form a good model to describe the shape of the digit.

The trend line (TL) is a trajectory that represents the center of the aggregated samples and hence the general shape of the samples of classes. The trend line may be found by estimating the mean at each line segment (sampling point). The trend line may be computed by applying the following equation:

$$TL_m(s) = \frac{1}{n_s} \sum_{i=1}^{n_s} y_i \quad (2)$$

where s is the line segment index, $n_s$ number of points in segment and $y_i$ is the segments direction at point i of the segment. The standard derivation may be computed by applying the following equation:

$$TL_s = \sqrt{\frac{1}{n_s} \sum_{i=1}^{n_s} (y_i - TL_m(s))^2} \quad (3)$$

In selected embodiments, the model envelope ME may be represented by two curves that surround the main body of the samples aggregation. The top and bottom envelopes describe the range and shape of each digit main body. Every sample may be represented as a function $y=C(x)$. $C=\{C(1), C(2), \ldots, C(n)\}$ may represent a set of curves that represent n samples. The bottom envelope is defined as the point-wise minimum of all samples. The bottom envelope for the set C at position i may be defined as follows:

$$B_c[i] = \min C_i(x) \quad (4)$$

where $x=1, 2, \ldots n$ and $i=1, 2, \ldots N$ is the number of points in each sample. Similarly, the top envelope of C is the point wise maximum of the samples curves in the set. The top envelope of C may be computed by applying the following equation:

$$T_c[i] = \max C_i(x) \quad (5)$$

where $x=1, 2, \ldots n$ and $i=1, 2, \ldots N$.

Figure 10:
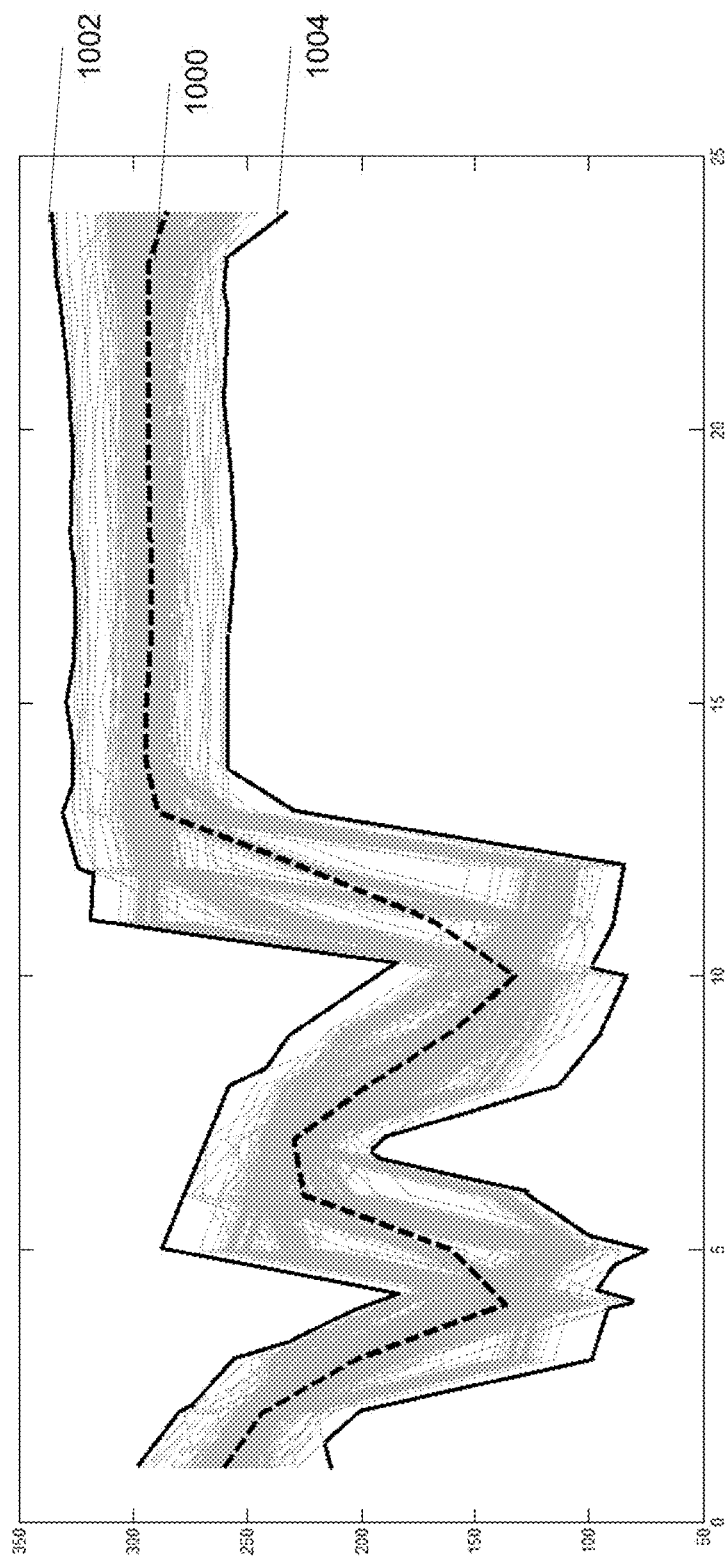
FIG. 10 is a graph that shows a model trend line and a model envelope according to one example.

FIG. 10 is a graph that shows a model trend line and a model envelope according to one example. The model trend line and the model envelope, for the sample digit "three", are calculated as described above. The directional representation of several training samples of the digit "three" are shown in FIG. 9. The top envelope is represented by trace 1002. The trace 1002 is the upper limit of the model. The top envelope is calculated using equation (5) in the training phase module 206. Trace 1004 represents the bottom envelope. The bottom envelope represents the lower limit of the model. The bottom envelope is calculated using equation (4). Trace 1000 represents the model trend line. In other embodiments, the top and bottom envelopes may be found by other methods such as graphical methods as would be understood by one of ordinary skill in the art.

In other embodiments, other models may be used to generate the fuzzy models. MTL and MLE may not always be the best way to build a general fuzzy model for digit classes. A single model is not necessarily a good representative for all class samples. Hence, the fuzzy models may be generated for the samples as described herein. For each training sample, a fuzzy model generated for that sample is a series of points that represent the directional features of that sample with the standard deviation of y-values of all training samples from the same class at each point. The standard deviation for each class (digit) is calculated from the training samples of that class.

Figure 11:
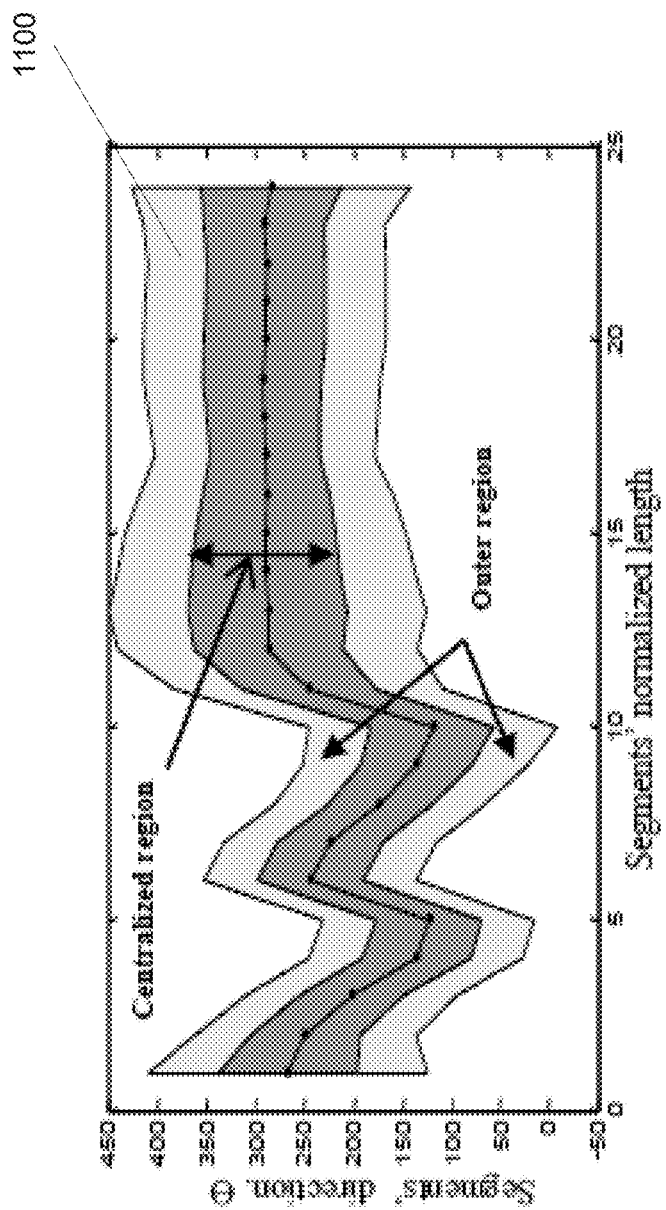
FIG. 11 is a graph that shows a fuzzy model according to one example.

FIG. 11 is a graph that shows a fuzzy model according to one example. The fuzzy model is generated as explained above for the digit "three" from the directional representations of several training samples shown in FIG. 9 and calculated in the features extraction module 204. Area 1100 (shaded) shown in FIG. 11 represents the fuzzy tolerance of the model. The width of this area on both sides may be a function of the standard deviation, which is calculated in the training phase module 206. The width of the fuzzy tolerance varies from one point to another according to the model as estimated in the training phase.

Figure 12B:
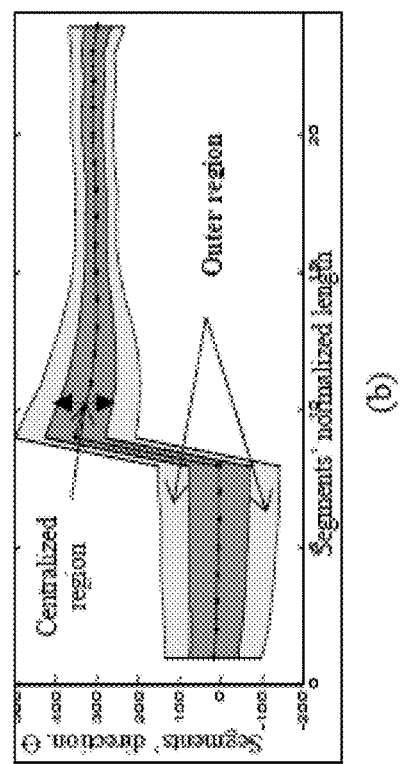
FIG. 12B is a graph that shows a fuzzy model according to one example.
Figure 12A:
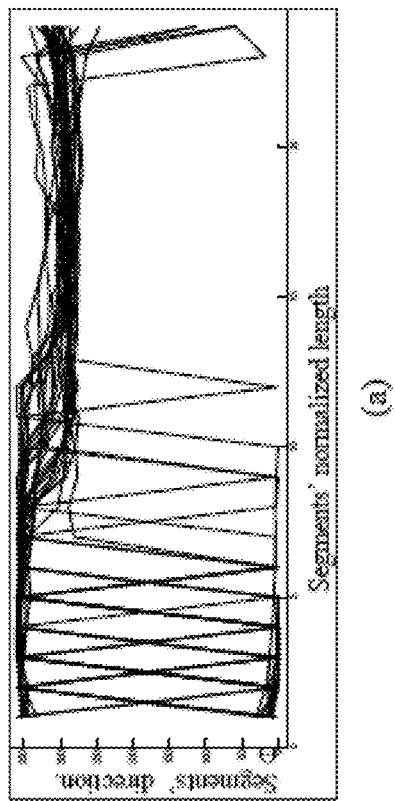
FIG. 12A is a graph that shows a directional representation of several samples of a digit according to one example.

FIG. 12A is a graph that shows the directional representation of several training samples of a digit according to one example. In this example, samples for the digit "six" are collected from different writers using the digit input device 200.

FIG. 12B is a graph that shows a fuzzy model according to one example. The fuzzy model for the digit "six" is calculated as explained above using the directional representation shown in FIG. 12A.

Figure 13:
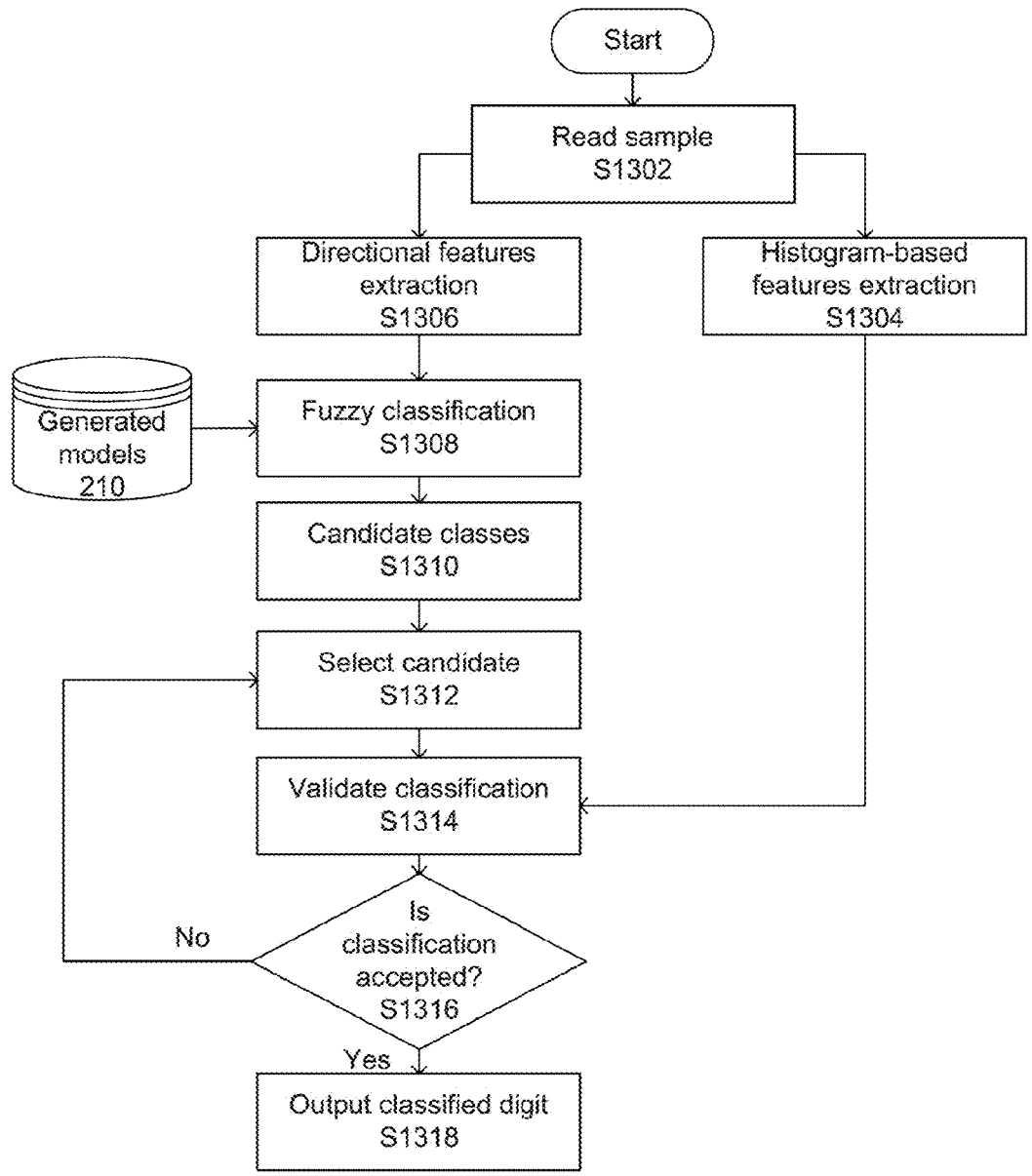
FIG. 13 is a flow chart for the fuzzy classification according to one example.

FIG. 13 is a flow chart for the fuzzy classification according to one example. At step S1302, a sample digit is obtained from the digit input device 200. At step S1306, directional features are extracted from the sample for example as described and shown in FIG. 8A. At step S1304, histogram-based features are extracted and are used at step S1314 to validate the classification. At step S1308, the server 300, using the CPU 1900, may use the fuzzy models saved in the generated models database 210 to classify the sample digit as one of the non-zero digits (digits from 1 to 9). As explained above, as a result of the normalization process, the directional features of each digit are represented by 24 points (angles). At each point, a fuzzy comparison between the sample and the fuzzy models is done to estimate their similarity. At step S1310, candidate classes may be obtained. At step S1312, a candidate is selected from the candidate classes generated at step S1310. For example, the server 300 may choose the candidate with the highest similarity.

At step S1314, the server 300 may validate the selection made at step S1312. The validation may be done by comparing the histogram-based features of the sample with the histogram-based features for the selected class. At step S1316, the server 300 may check whether the classification is accepted. In response to determining that the classification is accepted, step S1318 is executed. In response to determining that the classification is not accepted, the flow returns to step S1312 and another candidate is selected.

Figure 14:
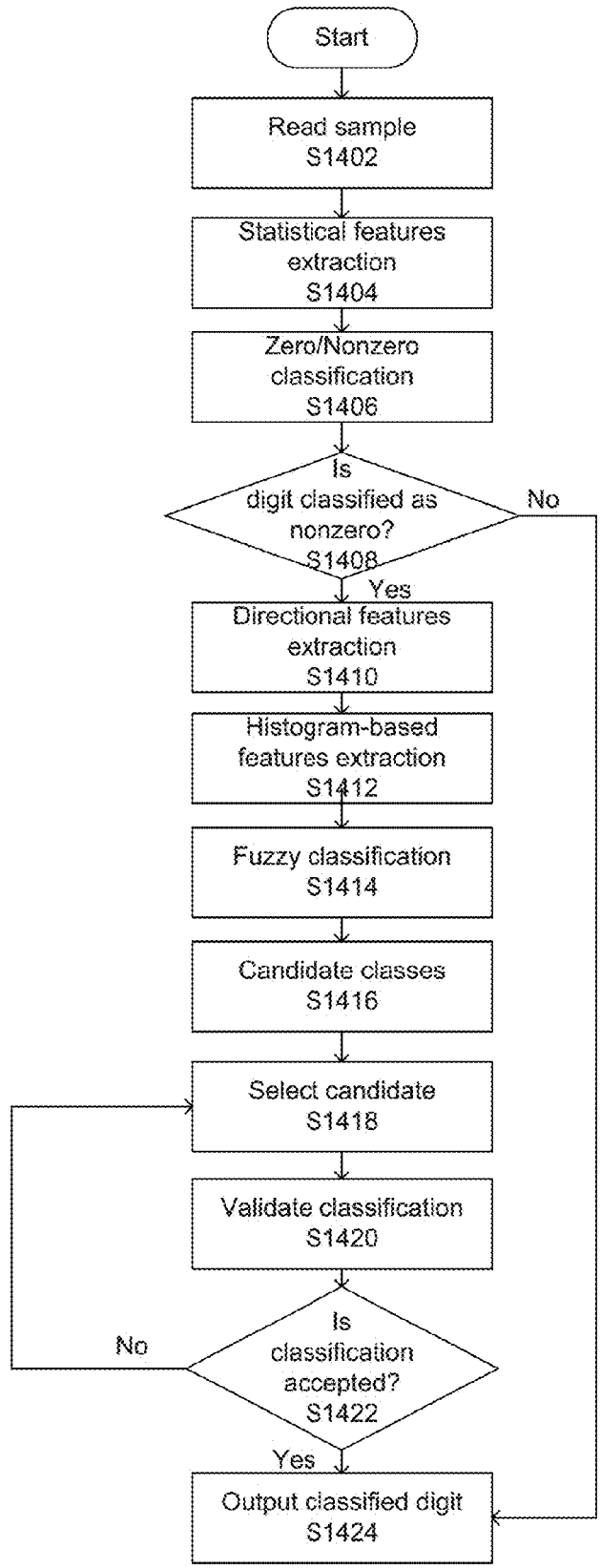
FIG. 14 is a flow chart for Arabic digit recognition according to one example.

FIG. 14 is a flow chart for Arabic digit recognition according to one example. At step S1402, a sample digit is obtained from the digit input device 200. At step S1404, the statistical features are extracted by the CPU. The proposed classification technique has two stages, namely zero/non-zero and fuzzy classification. The first stage recognizes digit zero "0" and the second stage recognizes digits from one "1" to nine "9". At step S1406, the sample digit is classified as zero or non-zero. The statistical features, extracted at step S1404, are used to classify digits into zero and non-zero. In one embodiment, a Support Vector Machine (SVM) classifier with Radial Basis Function (RBF) as the kernel may be used. The support Vector Machine (SVM) may use one or a combination of the length, width, height, height variance and aspect ratio of the digit as features. At step S1408, the system may check whether the digit has been classified as non-zero. In response to determining, that the digit is classified as non-zero step S1410 is executed. In response to determining, that the digit is zero step S1424 is executed. At step S1410, the directional features are extracted from the sample for example as described and shown in FIG. 8A. A step S1412, the histogram-based features are extracted. At step S1414, the server 300, using the CPU 1900, may use the fuzzy models saved in the generated models database 210 to classify the digit as one of the non-zero digits (digits from 1 to 9). The directional features extracted at step S1410 are used. As explained above, as a result of the normalization process, the directional features of each digit are represented by 24 points (angles). At each point, a fuzzy comparison between the sample and the fuzzy models is done to estimate their similarity. At step S1416, candidate classes may be obtained. At step S1418, a candidate is selected from the candidate classes generated at step S1416. For example, the server 300 may choose the candidate with the highest similarity.

At step S1420, the server 300 may validate the selection made at step S1418. The validation may be done by comparing the histogram-based features of the sample with the histogram-based features for the selected class. The decision taken by the fuzzy classifier may be evaluated based on the histogram-based features of the sample and the selected class. At step S1420, the server 300 may check whether the classification is accepted. The server may compute a similarity value based on the histogram-based features of the sample and the selected class. For example, the server 300 may compute the difference between the histogram-based features of the sample and the selected class. The similarity value may be compared with a predetermined threshold. In response to determining that the similarity value is larger than the predetermined threshold, the classification is accepted. The predetermined threshold may be stored in a memory. The predetermined threshold may be selected by the user. In other embodiments, the predetermined threshold may be based on the application of the system. In response to determining that the classification is accepted, step S1424 is executed. In response to determining that the classification is not accepted, the flow returns to step S1418 and another candidate is selected.

FIG. 15A is a graph that illustrates a fuzzy comparison between a sample digit and a fuzzy model according to one example. Trace 1500 represents the sample points. Trace 1502 represents the model line found as described above and shown in FIG. 10. Area 1504 represents the fuzzy tolerance of the model. The width of this area is based on the standard deviation estimated in the training phases, and is a function of the point. The membership of any point outside the tolerance region 1504 (shaded area) is considered as zero. Area 1504 may be further divided. The central area 1506, which is the middle part of area 1504. Any point in the central area 1506 has the membership at is taken as one which represents the peak of a fuzzy set. The membership outside in 1508 (light area) may be calculated based on a trapezoidal membership function as shown in FIG. 15B.

The membership value may be denoted as $M_v$. The membership value may be calculated by applying the following equation:

$$M_v(S(i), M(i)) = \begin{cases} 0, & d > \alpha_1 \text{ or } d < \alpha_2 & (a) \\ 1, & \beta_1 \leq d \leq \beta_2 & (b) \\ \frac{\alpha_1 - d}{\alpha_1 - \beta}, & \beta_1 < d \leq \alpha_1 & (c) \\ \frac{d - \alpha_2}{\beta_2 - \alpha_2}, & \alpha_2 \leq d < \beta_2 & (d) \end{cases} \quad (6)$$

where d is a directional feature of the sample, $\beta_1$ and $\beta_2$ are a first tolerance and $\alpha_1$ and $\alpha_2$ are a second tolerance.

The values of $\alpha_1$, $\alpha_2$, $\beta_1$, and $\beta_2$ may be taken as fixed values, for example, equal to 15 as described in: Parvez, M. T., and Mahmoud, S. A., "Arabic handwriting recognition using structural and syntactic pattern attributes", Pattern recognition, 46 (1), 141-154, (2013) incorporated herein by reference in its entirety. In other embodiments, these values may be automatically generated from the training samples in the training module 206. The membership value A represents the weight of the similarity between the sample S and the fuzzy model at that sampling point i. The value of $M_v \in [0,1]$ such that '0' (6a) means least similarity between the sample (outside of the area 1504) and the fuzzy model at that sampling point. Membership value '1' (6b) represents the maximum similarity (area 1506). Membership value in area 1508 is calculated using (6c) and (6d) of equation (6).

FIG. 15B is a graph that shows a fuzzy model according to one example. The graph shows a magnified part of FIG. 15A that illustrates the fuzzy model in a 3 dimensional representation. The figure shows a number of sampling points of the fuzzy model. The similarity check is done at each one of these points.

The overall similarity between M and S may be expressed as:

$$sim(S, M) = \frac{1}{N}\sum_{i=1}^{N} M_v(S(i), M(i)) \quad (7)$$

Figure 16:
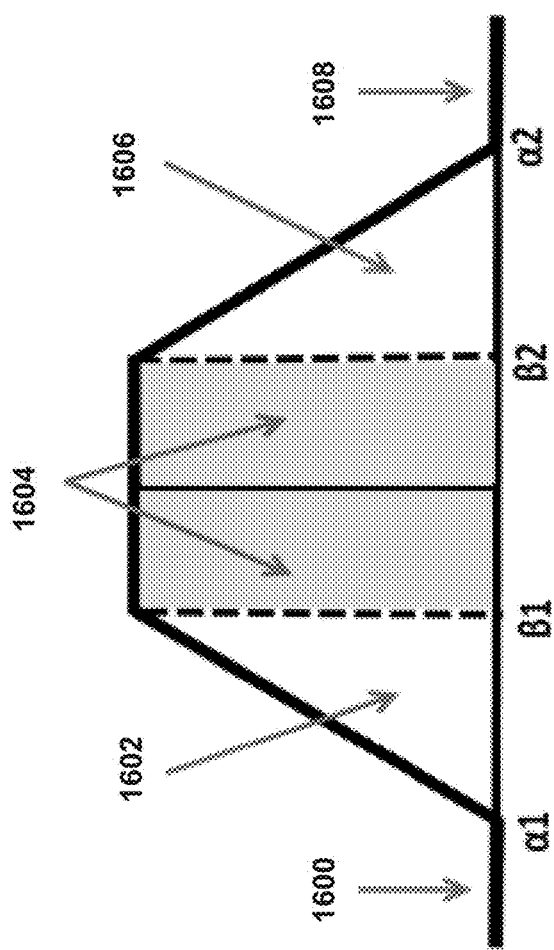
FIG. 16 is a graph that shows different regions of membership according to one example.

FIG. 16 is a graph that shows different regions of membership according to one example. Areas 1600, 1608 represent the regions where there is the least similarity between the fuzzy model and the sample. Area 1604 represents the region where there is the most similarity between the fuzzy model and the sample. Areas 1602, 1606 represent the regions as determined by equations (6c) and (6d) respectively.

To illustrate the capabilities of the Arabic online digits recognition system, exemplary results are presented.

The training module 206 receives a series of predetermined digits from at least one writer. Each writer may write the series of the predetermined digits using the digit input device 200. It is noted that the entire training phase is generally performed once, with each writer entering a number of digits. The received digits may be saved in the memory. The system may use existing database for training. For example, the system may use the Arabic Online Digits (AOD) Database proposed by Abdul Azeem, S. Meseery, M. El, and Ahmed, H., "Online Arabic Handwritten Digits Recognition", International Conference on Frontiers in Handwriting Recognition, 135-140 (2012) incorporated herein by reference in its entirety. The AOD database was collected from 300 different writers of varying ages and without enforcing any constraints on the digit size, orientation or number of strokes per digit. More than 32,000 online Arabic digits were collected by asking each writes to write an average of 10 samples per digit. About 78% of the AOD database was used in training and the remaining 22% of the data was used for testing.

All testing data are classified into zero or non-zero digits. SVM classifier with RBF was used in this stage. The classifier was designed for two-class problem with five dimensional feature vector (length, width, height, height's variance and aspect ratio). An overall accuracy of 99.55% was achieved in this phase.

The non-zero digits are classified by using the fuzzy classifier. A 20% of the training data is selected as validation data, which is used for the fuzzy model parameters estimation to find the parameters that give the highest recognition rates. Accordingly, the values for the first tolerance ($\beta_1$ and $\beta_2$) and the second tolerance ($\alpha_1$ and $\alpha_2$) are chosen as $\sigma_1/4$ and $\sigma_2/4$. These parameters are used with the extracted directional features of the testing data. A recognition rate of 93.36% was obtained at this stage. To improve the recognition rate of this stage, the histogram-based features are used to validate the decision taken by the fuzzy classifier at step S1420. In response to determining that the decision is inadequate, the next candidate class of the fuzzy classification is selected. After applying this improvement, the recognition rate reached 98.01%. In comparison, if the directional features with 24 features using SVM classifier are used to classify Arabic digits then an average recognition rate of 93% is achieved. Thus, the disclosed system and associated methodology is more effective than using directional features with SVM classifier for online Arabic digit recognition. Table 1 shows the confusion matrix of the fuzzy classification and histogram-based features.

TABLE 1

Confusion matrix of the enhanced fuzzy classification

| Digit | 1 | 2 | 3 | 4 | 5 | 6 | 7 | 8 | 9 |
|---|---|---|---|---|---|---|---|---|---|
| 1 | 836 | 1 | 5 | 0 | 0 | 11 | 1 | 0 | 0 |
| 2 | 2 | 653 | 1 | 8 | 2 | 0 | 0 | 0 | 6 |
| 3 | 4 | 2 | 651 | 0 | 0 | 0 | 0 | 0 | 1 |
| 4 | 0 | 7 | 1 | 676 | 0 | 3 | 0 | 0 | 2 |
| 5 | 0 | 0 | 0 | 0 | 694 | 0 | 0 | 1 | 2 |
| 6 | 0 | 1 | 0 | 3 | 0 | 650 | 0 | 0 | 9 |
| 7 | 1 | 3 | 4 | 1 | 0 | 2 | 677 | 3 | 0 |
| 8 | 3 | 0 | 6 | 1 | 0 | 0 | 0 | 661 | 2 |
| 9 | 1 | 1 | 6 | 1 | 2 | 14 | 0 | 1 | 659 |
| Recognition rate | 98.7 | 97.8 | 96.6 | 97.9 | 99.4 | 95.6 | 99.9 | 99.3 | 96.8 |
| Average Recognition rate | | | | | | | | | 98.01 |

The misclassified samples of the fuzzy classifier were analyzed carefully and it was found that some of these samples are badly written and may not be recognized by human. Therefore, subjective evaluation was conducted to recognize the misclassified samples. The images of the misclassified samples were printed randomly in a form and the form is given to 30 graduate/undergraduate students. Each student was told that these images are images of Arabic digits and was asked to label the images, as he perceives in the image. The results of this subjective evaluation are summarized in table 2.

TABLE 2

The overall classification results of the human subjects

| Digit | Misclassified sample count | Correctly classified | Incorrectly classified | Undetermined |
|---|---|---|---|---|
| 1 | 12 | 1.67 | 42.22 | 56.11 |
| 2 | 13 | 86.89 | 0 | 13.11 |
| 3 | 23 | 80.14 | 4.93 | 14.93 |
| 4 | 14 | 83.33 | 10.48 | 6.19 |
| 5 | 4 | 45.83 | 4.17 | 50.00 |
| 6 | 31 | 64.19 | 13.87 | 21.94 |
| 7 | 1 | 0 | 10 | 90 |
| 8 | 5 | 67.33 | 11.33 | 21.33 |
| 9 | 22 | 64.85 | 16.36 | 18.79 |
| Average | | 64.77 | 13.12 | 22.11 |

As shown in table 2, labels obtained from the students are classified into three groups. The first group includes the number of answers that correctly labeled the digit. The second group indicates the number of answers that labeled the digit incorrectly. The last group includes the number of responses where the students were unable to label the images. The subjective evaluation of the results shows that most students were not able to classify digits '1' and '7' correctly. Digits "5", "6", "8" and "9" were correctly labeled by no more than 68%.

Figure 17:
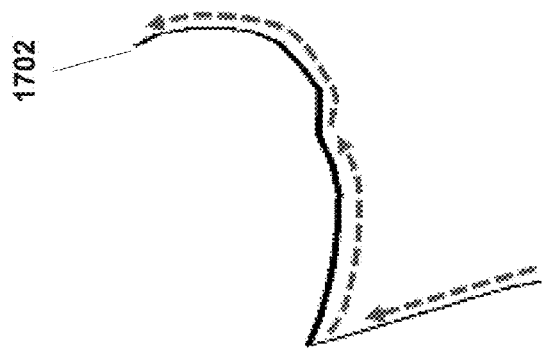
FIG. 17 is a schematic that shows different writing directions of a digit according to one example.
Figure 17:
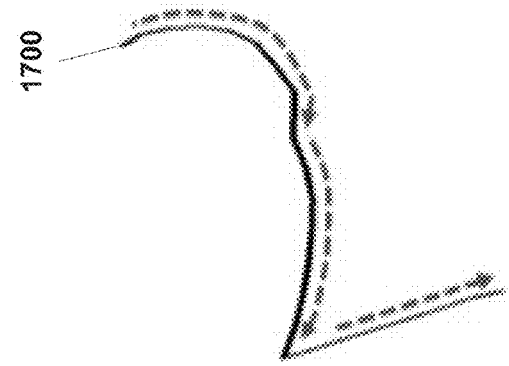

FIG. 17 is a schematic that shows different writing directions of a digit according to one example. In this example, the different writing directions for digit "three" are shown. 1700 is the graph of the digit "three" written in the proper direction. 1702 shows the digit "three" written in the wrong direction. Some samples of digits "2", "3" and "4" were not reflecting the proper directional way of writing these digits. The order of these samples is different from the normal order of writing. It is not easy to recognize these samples based on their directional features. However, images of these samples can be recognized easily by humans.

The overall results show that approximately 65% of the samples were classified correctly by humans, approximately 13% were incorrectly classified and approximately 23% were undetermined. Therefore, approximately 35% of the misclassified digits by the system were not classified by humans. In one example, when the unreadable samples by humans are removed our combined recognition rate (stages 1 and 2) reached 99.55%.

Figure 18:
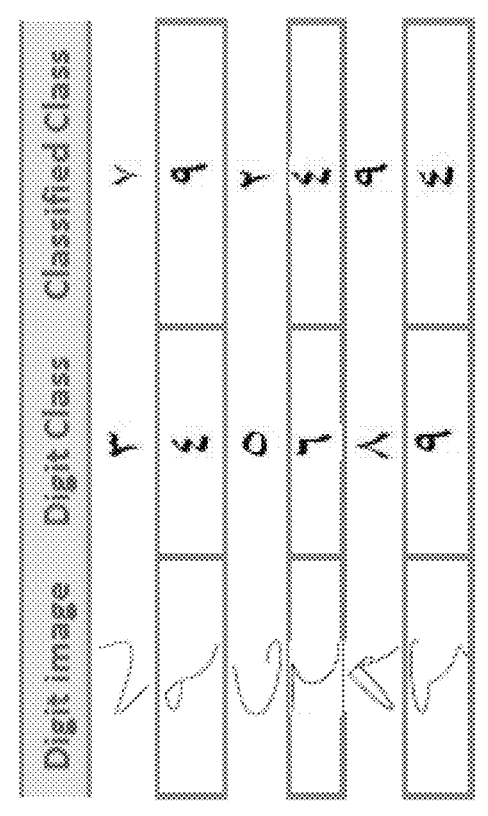

FIG. 18 is a table that shows a plurality of misclassified samples according to one example. The table shows the digit image as captured by the digit input device 200, an actual digit class, and the classified class obtained from the fuzzy classifier.

Next, a hardware description of the server 300 according to exemplary embodiments is described with reference to FIG. 19. In FIG. 19, the server 300 includes a CPU 1900 which performs the processes described above. The process data and instructions may be stored in memory 1902. These processes and instructions may also be stored on a storage medium disk 1904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 300 communicates, such as a server or computer.

Further, the claimed advancements may be provided as a utility application, background daemon, or component of an operating system, or combination thereof, executing in conjunction with CPU 1900 and an operating system such as Microsoft Windows 7, UNIX, Solaris, LINUX, Apple MAC-OS and other systems known to those skilled in the art.

CPU 1900 may be a Xenon or Core processor from Intel of America or an Opteron processor from AMD of America, or may be other processor types that would be recognized by one of ordinary skill in the art. Alternatively, the CPU 1900 may be implemented on an FPGA, ASIC, PLD or using discrete logic circuits, as one of ordinary skill in the art would recognize. Further, CPU 1900 may be implemented as multiple processors cooperatively working in parallel to perform the instructions of the inventive processes described above.

The server 300 in FIG. 19 also includes a network controller 1906, such as an Intel Ethernet PRO network interface card from Intel Corporation of America, for interfacing with network 302. As can be appreciated, the network 302 can be a public network, such as the Internet, or a private network such as an LAN or WAN network, or any combination thereof and can also include PSTN or ISDN subnetworks. The network 302 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 300 further includes a display controller 1908, such as a NVIDIA GeForce GTX or Quadro graphics adaptor from NVIDIA Corporation of America for interfacing with display 1910, such as a Hewlett Packard HPL2445w LCD monitor. A general purpose I/O interface 1912 interfaces with a keyboard and/or mouse 1914 as well as a touch screen panel 1916 on or separate from display 1910. General purpose I/O interface also connects to a variety of peripherals 1918 including printers and scanners, such as an OfficeJet or DeskJet from Hewlett Packard.

A sound controller 1920 is also provided in the server 300, such as Sound Blaster X-Fi Titanium from Creative, to interface with speakers/microphone 1922 thereby providing sounds and/or music.

The general purpose storage controller 1924 connects the storage medium disk 1904 with communication bus 1926, which may be an ISA, EISA, VESA, PCI, or similar, for interconnecting all of the components of the server 300. A description of the general features and functionality of the display 1910, keyboard and/or mouse 1914, as well as the display controller 1908, storage controller 1924, network controller 1906, sound controller 1920, and general purpose I/O interface 1912 is omitted herein for brevity as these features are known.

A system, which includes the features in the foregoing description, provides numerous advantages to the users. In particular, the system and method permits Arabic online digits recognition and is applicable to other handwritten symbols. The present disclosure has the advantage of digit recognition with high accuracy. Thus, the present disclosure provides an improvement to the technical field by recognizing online digits or other symbols with low error. In addition, the present disclosure has the advantage of using saved fuzzy models thus minimizing computation. Thus, the present disclosure improves the functioning of the server by increasing processing speed, decreasing power consumption and resulting in a chip area reduction. With the rapid development in online form filling, online digit recognition becomes critically essential and indispensable.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for Arabic like alphanumeric character recognition, comprising:
   receiving a handwritten Arabic like alphanumeric character, from an alphanumeric input device;
   storing, in a memory, fuzzy models of a plurality of Arabic like alphanumeric characters;
   preprocessing, by processing circuitry, the handwritten Arabic like alphanumeric character;
   extracting, by the processing circuitry, features from the preprocessed Arabic like alphanumeric character;
   computing, by the processing circuitry, a similarity value based on fuzzy comparisons between points of the preprocessed Arabic like alphanumeric character and the stored fuzzy models;
   classifying, by the processing circuitry, the handwritten Arabic like alphanumeric character based at least in part on the similarity value; and
   outputting a classified alphanumeric character,
   wherein the similarity value between a preprocessed Arabic like alphanumeric character S and a fuzzy model M is calculated based on a membership value calculated by applying $$sim(S, M) = \frac{1}{N}\sum_{i=1}^{N} M_v(S(i), M(i))$$

wherein the membership value is expressed as:

$$M_v(S(i), M(i)) = \begin{cases} 0, & d > \alpha_1 \text{ or } d < \alpha_2 \\ 1, & \beta_1 \leq d \leq \beta_2 \\ \frac{\alpha_1 - d}{\alpha_1 - \beta}, & \beta_1 < d \leq \alpha_1 \\ \frac{d - \alpha_2}{\beta_2 - \alpha_2}, & \alpha_2 \leq d < \beta_2 \end{cases}$$

where N is a number of points, d is a directional feature of the preprocessed Arabic like alphanumeric character S at point i, $\beta_1$ and $\beta_2$ are a first tolerance and $\alpha_1$ and $\alpha_2$ are a second tolerance.

2. The method of claim 1, wherein the features of the preprocessed Arabic like alphanumeric character include directional features, histogram-based features and statistical features.

3. The method of claim 2, further comprising:
   validating, the classification using the histogram-based features; and
   refining the classification in response to determining that the classification is not valid.

4. The method of claim 2, wherein the statistical features include at least one of a length, a width, a height, a height's variance and an aspect ratio of the preprocessed Arabic like alphanumeric character.

5. The method of claim 2, further comprising:
   classifying the handwritten Arabic like alphanumeric character as the digit 0 based on the statistical features.

6. The method of claim 1, wherein the fuzzy models are generated based on directional features obtained from training samples of handwritten Arabic like alphanumeric characters.

7. The method of claim 6, wherein the training samples are obtained from a plurality of different users.

8. The method of claim 1, wherein the first tolerance and the second tolerance of a fuzzy model are based on a standard deviation obtained from directional features.

9. A system for Arabic like alphanumeric character recognition, the system comprising:
   a alphanumeric input device; and
   processing circuitry configured to
      receive a handwritten Arabic like alphanumeric character, from the alphanumeric input device;
      store, in a memory, fuzzy models of a plurality of Arabic like alphanumeric characters;
      preprocess the handwritten Arabic like alphanumeric character;
      extract features from the preprocessed Arabic like alphanumeric character;
      compute a similarity value based on fuzzy comparisons between points of the preprocessed Arabic like alphanumeric character and the stored fuzzy models;
      classify the handwritten Arabic like alphanumeric character based at least in part on the similarity value; and
      output a classified alphanumeric character,
   wherein the similarity value between the preprocessed Arabic like alphanumeric character S and a fuzzy model M is calculated based on a membership value calculated by applying $$sim(S, M) = \frac{1}{N}\sum_{i=1}^{N} M_v(S(i), M(i))$$

wherein the membership value is expressed as:

$$M_v(S(i), M(i)) = \begin{cases} 0, & d > \alpha_1 \text{ or } d < \alpha_2 \\ 1, & \beta_1 \leq d \leq \beta_2 \\ \frac{\alpha_1 - d}{\alpha_1 - \beta}, & \beta_1 < d \leq \alpha_1 \\ \frac{d - \alpha_2}{\beta_2 - \alpha_2}, & \alpha_2 \leq d < \beta_2 \end{cases}$$

where N is a number of points, d is a directional feature of the preprocessed Arabic like alphanumeric character S at point i, $\beta_1$ and $\beta_2$ are a first tolerance and $\alpha_1$ and $\alpha_2$, are a second tolerance.

10. The system of claim 9, wherein the features of the preprocessed Arabic like alphanumeric character include directional features, histogram-based features and statistical features.

11. The system of claim 10, wherein the processing circuitry is further configured to:
   validate the classification using the histogram-based features; and
   refine the classification in response to determining that the classification is not valid.

12. The system of claim 10, wherein the statistical features include at least one of a length, a width, a height, a height's variance and an aspect ratio of the preprocessed Arabic like alphanumeric character.

13. The system of claim 10, wherein the processing circuitry is further configured to:
   classify the handwritten Arabic like alphanumeric character as the digit 0 based on the statistical features.

14. The system of claim 9, wherein the fuzzy models are generated based on directional features obtained from training samples of handwritten Arabic like alphanumeric characters.

15. The system of claim 14, wherein the training samples are obtained from a plurality of different users.

16. The system of claim 9, wherein the first tolerance and the second tolerance of a fuzzy model are based on a standard deviation obtained from directional features.

17. A system for Arabic like alphanumeric character recognition, the system comprising:
   an alphanumeric input device; and
   processing circuitry configured to
      receive a handwritten Arabic like alphanumeric character, from the alphanumeric input device;
      store, in a memory, fuzzy models of a plurality of Arabic like alphanumeric characters;
      preprocess the handwritten Arabic like alphanumeric character;
      extract features from the preprocessed Arabic like alphanumeric character;
      compute a similarity value based on fuzzy comparisons between points of the preprocessed Arabic like alphanumeric character and the stored fuzzy models;
      classify the handwritten Arabic like alphanumeric character based at least in part on the similarity value; and
      output a classified alphanumeric character,
   wherein the features of the preprocessed Arabic like alphanumeric character include directional features, histogram-based features and statistical features.

* * * * *